United States Patent

Kami et al.

[11] Patent Number: 5,547,224
[45] Date of Patent: Aug. 20, 1996

[54] AUTOMOTIVE SUBFRAME FOR SUPPORTING A VEHICLE SUSPENSION SYSTEM

[75] Inventors: Yozo Kami; Teruaki Anzawa; Yasunori Oku; Shinji Hinosawa, all of Saitama-ken, Japan

[73] Assignee: Hondo Giken Kogyo Kabushiki Kaisha, Tokyo, Japan

[21] Appl. No.: 390,220

[22] Filed: Feb. 16, 1995

[30] Foreign Application Priority Data

Mar. 9, 1994 [JP] Japan ...................................... 6-65704

[51] Int. Cl.$^6$ ..................................................... B60P 3/22
[52] U.S. Cl. .......................................... 280/834; 280/781
[58] Field of Search .................................... 180/69.4, 311, 180/312, 296; 280/781, 784, 834; 296/204

[56] References Cited

U.S. PATENT DOCUMENTS

| | | | |
|---|---|---|---|
| 4,098,520 | 7/1978 | Ezaki et al. | 280/784 |
| 4,453,740 | 6/1984 | von der Ohe et al. | 280/781 |

FOREIGN PATENT DOCUMENTS

| | | | |
|---|---|---|---|
| 0191130 | 11/1982 | Japan | 180/69.4 |
| 4011517 | 1/1992 | Japan | 280/834 |

*Primary Examiner*—Paul N. Dickson
*Attorney, Agent, or Firm*—Armstrong, Westerman, Hattori, McLeland & Naughton

[57] ABSTRACT

In an automotive subframe having a rectangular annular shape as seen in plan view, the longitudinal members have closed cross sections, but the lateral members open cross sections and are provided with open parts adapted to receive a flange projecting from the fuel tank. Because the lateral members have open cross sections, the subframe is capable of undergoing a twisting deformation relatively easily, and the sloshing movement of the fuel inside the fuel tank would not be directly transmitted to the vehicle body. Because the longitudinal members have closed cross sections, and therefore have a relatively high rigidity, the wheel suspension system can be securely supported without creating any possibility of changes in the wheel alignment. Furthermore, the open part of the lateral subframe member can conveniently receive the flange of the fuel tank, and it is possible to maximize the capacity of the fuel tank without causing any interference between the fuel tank and the lateral member.

10 Claims, 2 Drawing Sheets

AUTOMOTIVE SUBFRAME FOR SUPPORTING A VEHICLE SUSPENSION SYSTEM

TECHNICAL FIELD

The present invention relates to an automotive subframe adapted to be placed between a wheel suspension system and the vehicle body frame.

BACKGROUND OF THE INVENTION

It is known to mount a subframe on a vehicle body frame via mount bushes having a relatively high compliance and pivotably attach inner ends of suspension arms to the subframe via mount bushes having a relatively low compliance to the end of preventing the vibrations transmitted from the tires to the suspension arms from reaching the vehicle body, and to ensure a high rigidity against changes in wheel alignment.

Normally, such a subframe comprises a pair of spaced apart parallel longitudinal members, and a pair of parallel lateral members connecting the front and rear ends of the longitudinal members one another, and thus has a rectangular annular shape as seen in plan view. Therefore, it is advantageous to place a fuel tank inside the space defined by the subframe members to protect the fuel tank from possible damages.

When a fuel tank is placed inside the space defined by the subframe members, the sloshing movement of the fuel inside the fuel tank tends to apply a twisting force to the subframe. The subframe members normally have closed cross sections to be resistant against such twisting deformation, and the subframe as a whole is relatively rigid against twisting deformation. Therefore, the sloshing movement of fuel inside the fuel tank tends to cause undesirable vibrations of the vehicle body which could be noticed by the vehicle occupants.

An automotive fuel tank is typically made of a pair of halves each formed into the shape of a flanged bowl by stamping sheet metal, and welding them together along the flanges extending along the outer rims of the two halves. Therefore, when such a fuel tank is placed inside the space defined by the subframe members, the interference between the flange and the subframe members limits the effective lateral dimension or the capacity of the fuel tank.

BRIEF SUMMARY OF THE INVENTION

In view of such problems of the prior art, a primary object of the present invention is to provide an automotive subframe which has well balanced rigidity which ensures proper wheel alignment to be maintained, and prevents sloshing movement of fuel inside the fuel tank from causing undesirable vibrations of the vehicle body.

A second object of the present invention is to provide an automotive subframe which can accommodate a fuel tank inside the space defined by subframe members without significantly limiting the possible capacity of the fuel tank.

A third object of the present invention is to provide an automotive subframe which has a well balanced rigidity and can be constructed as a light weight structure.

A fourth object of the present invention is to provide an automotive subframe which has a sufficient bending rigidity without excessively increasing the twisting rigidity thereof.

A fifth object of the present invention is to provide an automotive subframe which is less likely to cause damages to the fuel tank even when the subframe has collapsed as a result of a vehicle crash.

These and other objects of the present invention can be accomplished by providing an automotive subframe adapted to be interposed between a wheel suspension system and a vehicle body, and having an annular shape for defining an inner space for accommodating a fuel tank therein, comprising: a pair of longitudinal members extending substantially in parallel to each other, each of the longitudinal members having a substantially closed cross section; and a pair of lateral members extending substantially in parallel to each other across front and rear end portions of the longitudinal members, each of the lateral members having an open cross section, an open part of the open cross section of at least one of the lateral members being adapted to receive a flange projecting from the fuel tank.

Because the lateral members have open cross sections, the subframe is capable of undergoing a twisting deformation relatively easily, and the sloshing movement of the fuel inside the fuel tank would not be directly transmitted to the vehicle body. Because the longitudinal members have closed cross sections, and therefore have a relatively high rigidity, the wheel suspension system can be securely supported without creating any possibility of changes in the wheel alignment. Furthermore, the open part of the lateral subframe member can conveniently receive the flange of the fuel tank, and it is therefore possible to maximize the capacity of the fuel tank without causing any interference between the fuel tank and the lateral member.

Preferably, the open part of the lateral member has a sufficient depth to entirely receive the flange, and is provided with a substantially vertical section at least on one side of the open part. Thus, the flange is not likely to be deformed by the lateral members even when the subframe has collapsed due to a vehicle crash. This is advantageous because deformation in the flange tends to cause an undesirable damage to the fuel tank, and should be avoided. Furthermore, the substantially vertical section provided at least on one side of the open part of the lateral member abuts the corresponding side wall of the fuel tank over a relatively large surface area, and the surface pressure can be therefore prevented from becoming excessive in case of a vehicle crash. The open part of the longitudinal member can be defined by a substantially vertical section and one or a pair of substantially horizontal sections adjoining the substantially vertical section.

To allow the longitudinal members to better support lateral forces applied by suspension arms, performance rods may be connected across the middle parts of the longitudinal members. In such a case, possible interference between the performance rods and the fuel tank can be avoided by providing grooves for receiving the performance rods on upper and lower surfaces of the fuel tank.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
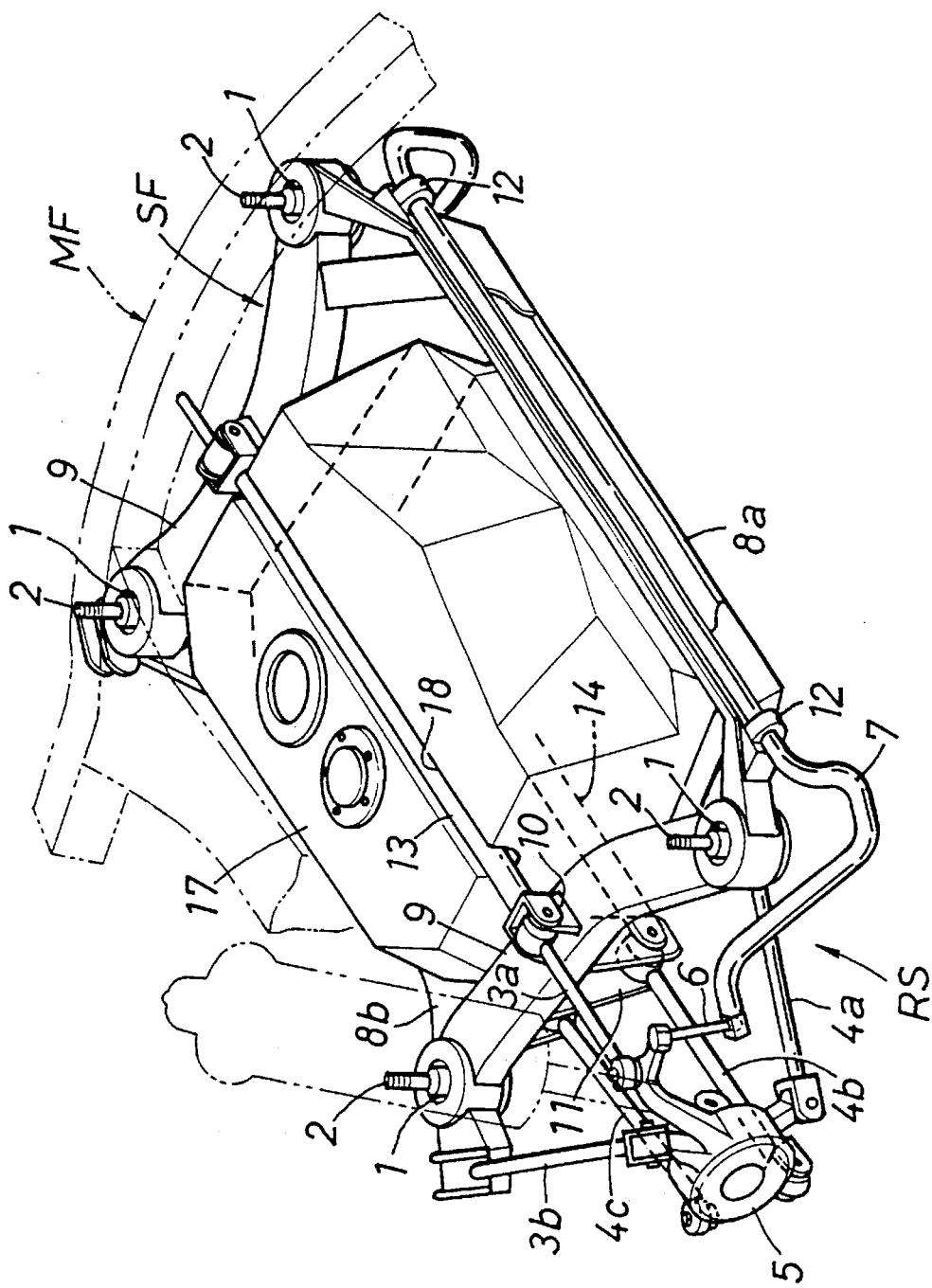
FIG. 1 is a perspective view of a subframe fitted with a fuel tank and a wheel suspension system.

FIG. 1 shows a multi-link rear suspension system RS supported by an embodiment of the subframe according to the present invention. The subframe SF is mounted on a lower surface of a main frame MF via fastening bolts 2 passed through central openings of mount rubber blocks 1 provided on four corners of the subframe SF. The suspension system RS consists of two parts for the right and left rear wheels, and each of these parts comprises a pair of upper arms 3a and 3b and three lower arms 4a, 4b and 4c, each of these upper and lower arms having an internal end pivotally attached to the subframe SF, and a rear hub carrier 5 supported by the outer ends of these upper and lower arms 3 and 4. Two ends of a stabilizer rod 7 are connected to the right and left hub carriers 5 via respective stabilizer links 6.

The subframe SF comprises a pair of lateral members 8a and 8b extending substantially parallel to each other, and a pair of longitudinal members 9 which are passed across the terminal ends of the lateral members 8, again in mutually substantially parallel relationship. Thus, the subframe SF has a rectangular annular shape as seen in plan view. A middle part of each of the longitudinal member 9 is provided with an upper bracket 10 on an upper surface thereof, and the inner end of the upper front arm 3a of the corresponding side is supported by this upper bracket 10. A lower bracket 11 is provided on a lower surface of a middle part of each of the longitudinal members 9, and an inner end of the middle lower arm 4b of the corresponding side is supported by this lower bracket 11. The two longitudinal members 9 are connected to each other by an upper lateral performance rod 13 secured to upper brackets 10 formed on upper surfaces of the longitudinal members 9 and by a lower lateral performance rod 14 secured to lower brackets 11 formed on lower surfaces of the longitudinal members 9. The stabilizer rod 7 is supported by a pair of saddles 12 secured to the front surface of the front lateral member 8a at either lateral end thereof.

An inner space defined by the lateral members 8 and the longitudinal members 9 of the subframe SF receives therein a fuel tank 17 which consists of an enclosed hollow container formed by forming a pair of bowl-shaped halves each formed by stamp forming sheet metal, and welding flanges formed on the open ends of the two halves. The upper and lower ends of the fuel tank 17 is provided with lateral grooves 18 and 19 for receiving the performance rods 13 and 14 therein. Rubber blocks 20 are interposed between the performance rods 13 and 14 and the grooves 18 and 19 for restricting movement and deformation of the fuel tank 17 while the vibrations of the fuel tank 17 are prevented from being transmitted to the subframe SF.

The longitudinal members 9 of the subframe SF each consist of a rectangular tubular member having a rectangular closed cross section while the lateral members 8 of the subframe SF each consist of a channel member having an open cross section including at least one substantially horizontal part H and at least one substantially vertical part V.

The load of the fuel tank 17 is in most part supported by the longitudinal members 9 via the performance rods 13 and 14 as a vertical load. At the same time, the longitudinal members 9 are subjected to lateral loads from the lateral rods 3 and 4. Therefore, the longitudinal members 9 are required to have a sufficient rigidity against bending and twisting deformations. When the fuel inside the fuel tank 17 makes a sloshing movement, this tends to produce twisting deformations of the lateral members 8, and these deformations tend to be transmitted to the vehicle body MF as twisting vibrations. Therefore, it is advantageous to control the rigidity of the lateral members 8 against twisting deformation.

Figure 2:
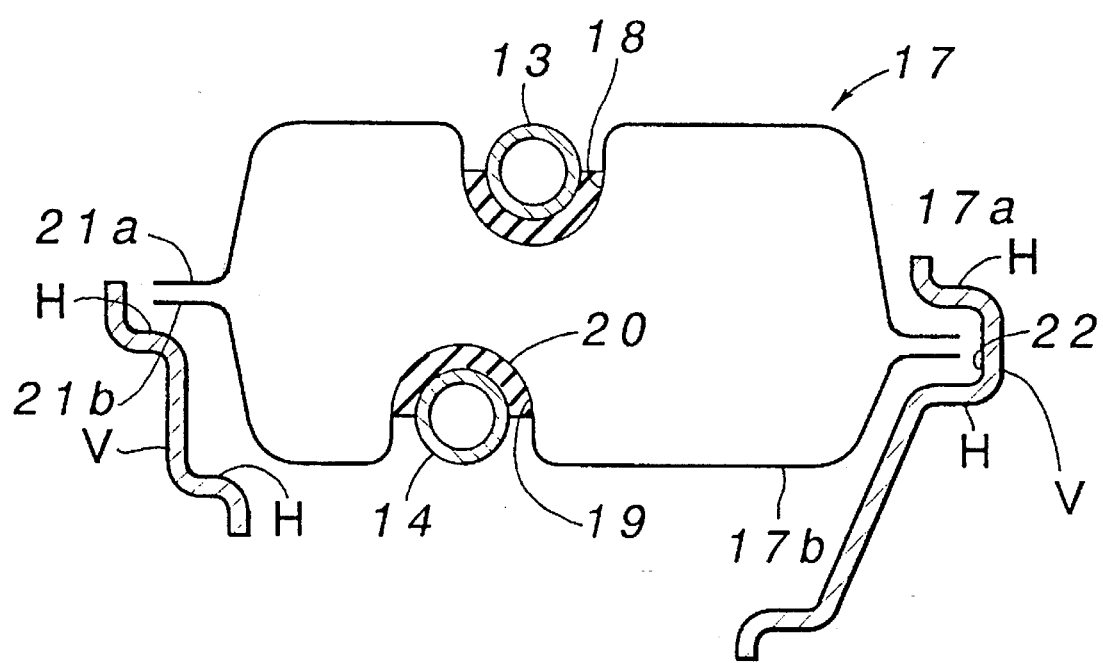
FIG. 2 is a longitudinal sectional view of the subframe and the fuel tank received therein.

Thus, according to the present invention, the lateral members 8a and 8b are each provided with an open cross section so as to have a controlled rigidity against twisting deformation. Furthermore, a part of the flange 21 of the fuel tank 17 is overlaid on a horizontal part H of the lateral member 8, and another part of the flange of the fuel tank is received in a slot 22 (FIG. 2) defined by a pair of adjacent horizontal parts H of the lateral member 8. In either case, the lateral member 8a or 8b presents a recess or an open part facing the fuel tank 17, and receives the flange 21 therein. The flange 21 of the fuel tank 17 is thus made to interdigitate or otherwise be received in the open parts of the cross sections of the lateral members 8, and is prevented from interfering with the lateral members 8. As a result, the possible effective fore-and-aft dimension of the fuel tank is maximized for a given distance between the two lateral members.

Furthermore, by selecting the width of each of the horizontal parts H of the lateral members 8 to be greater than the corresponding width of the flange 21 of the fuel tank 17, when the subframe SF has collapsed in the fore-and-aft direction typically as a result of a vehicle crash, the vertical parts V are brought into contact with the vertical surfaces of the fuel tank 17, and the flange 21 of the fuel tank 17 is less likely to be deformed by a direct contact with the lateral members 8, the possibility of incurring damages to the fuel tank 17 at the time of a vehicle crash can be substantially reduced.

Although the present invention has been described in terms of preferred embodiments thereof, it is obvious to a person skilled in the art that various alterations and modifications are possible without departing from the scope of the present invention which is set forth in the appended claims.

What we claim is:

1. In combination:
    (a) a fuel tank having a flange extending around at least a portion thereof;
    (b) an automotive subframe adapted to be interposed between a wheel suspension system and a vehicle body, and having an annular shape for defining an inner space for accommodating said fuel tank therein, comprising:
    a pair of longitudinal members extending substantially in parallel to each other, each of said longitudinal members having a substantially closed cross section; and
    a pair of lateral members extending substantially in parallel to each other across front and rear end portions of said longitudinal members, each of said lateral members having an open cross section, an open part of said open cross section of at least one of said lateral members receiving a portion of said flange projecting from said fuel tank.

2. The combination according to claim 1, wherein said open part of said lateral member has a sufficient depth to entirely receive said flange, and is provided with a substantially vertical section at least on one side of said open part.

3. The combination according to claim 2, wherein said open part of said lateral member is defined by a substantially vertical section and a pair of substantially horizontal sections adjoining said substantially vertical section.

4. The combination according to claim 2, wherein said open part of said lateral member is defined by a substantially vertical section and a substantially horizontal section adjoining said substantially vertical section.

5. The combination according to claim 1, wherein said longitudinal members are connected together by a lateral performance rod, and an upper surface of said fuel tank is provided with a groove for receiving said performance rod.

6. The combination according to claim 1, wherein said longitudinal members are connected together by a lateral performance rod, and a lower surface of said fuel tank is provided with a groove for receiving said performance rod.

7. The combination according to claim 1, wherein said fuel tank is made of a pair of halves each formed into a bowl with flange portions, and each said halves are welded together along said flange portions.

8. The combination according to claim 5, wherein said longitudinal members are connected together by a second lateral performance rod, and a lower surface of said fuel tank is provided with a groove for receiving said second performance rod.

9. The combination according to claim 1, wherein said open part of said at least one lateral member includes a substantially horizontal section, and wherein said flange has a part which is overlaid on said horizontal section.

10. The combination according to claim 1, wherein said fuel tank is made of a pair of halves each formed with flange portions, and each said halves are connected together along said flange portions to form said flange such that said flange contributes to the joining of the two halves of the fuel tank.

* * * * *